Sept. 7, 1926.
E. J. HALL
1,598,861
TRANSMISSION GEARING
Filed Nov. 27, 1925    2 Sheets-Sheet 2
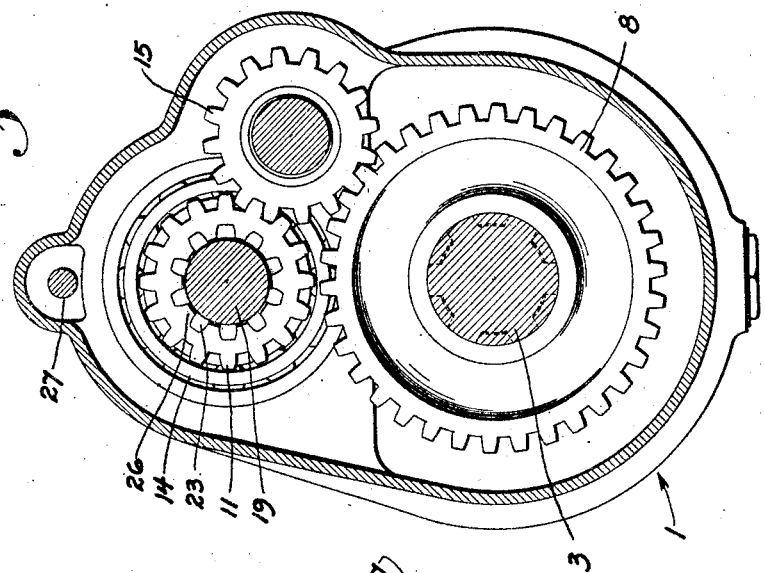
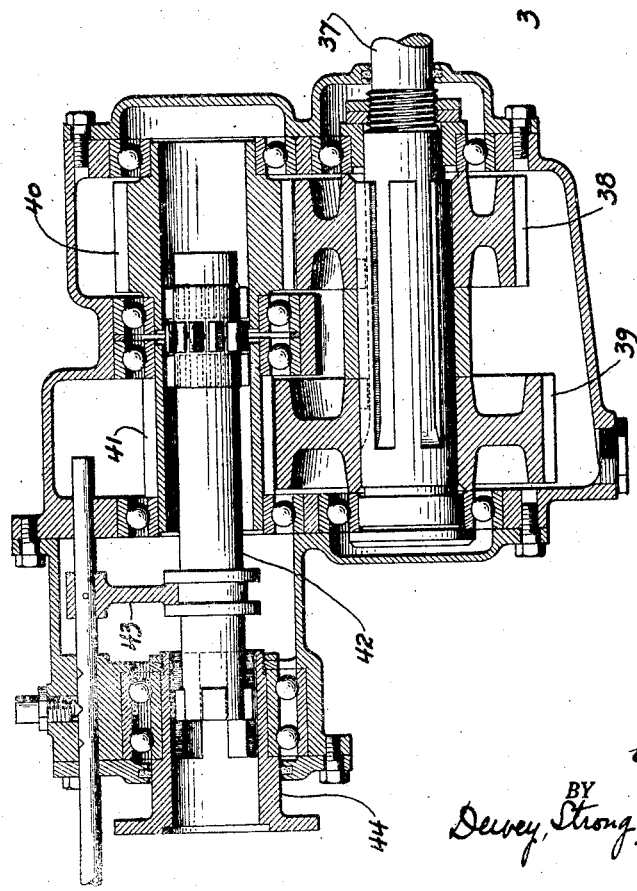
INVENTOR.
Elbert J. Hall.
BY Dewey, Strong, Townsend & Loftus.
ATTORNEYS.

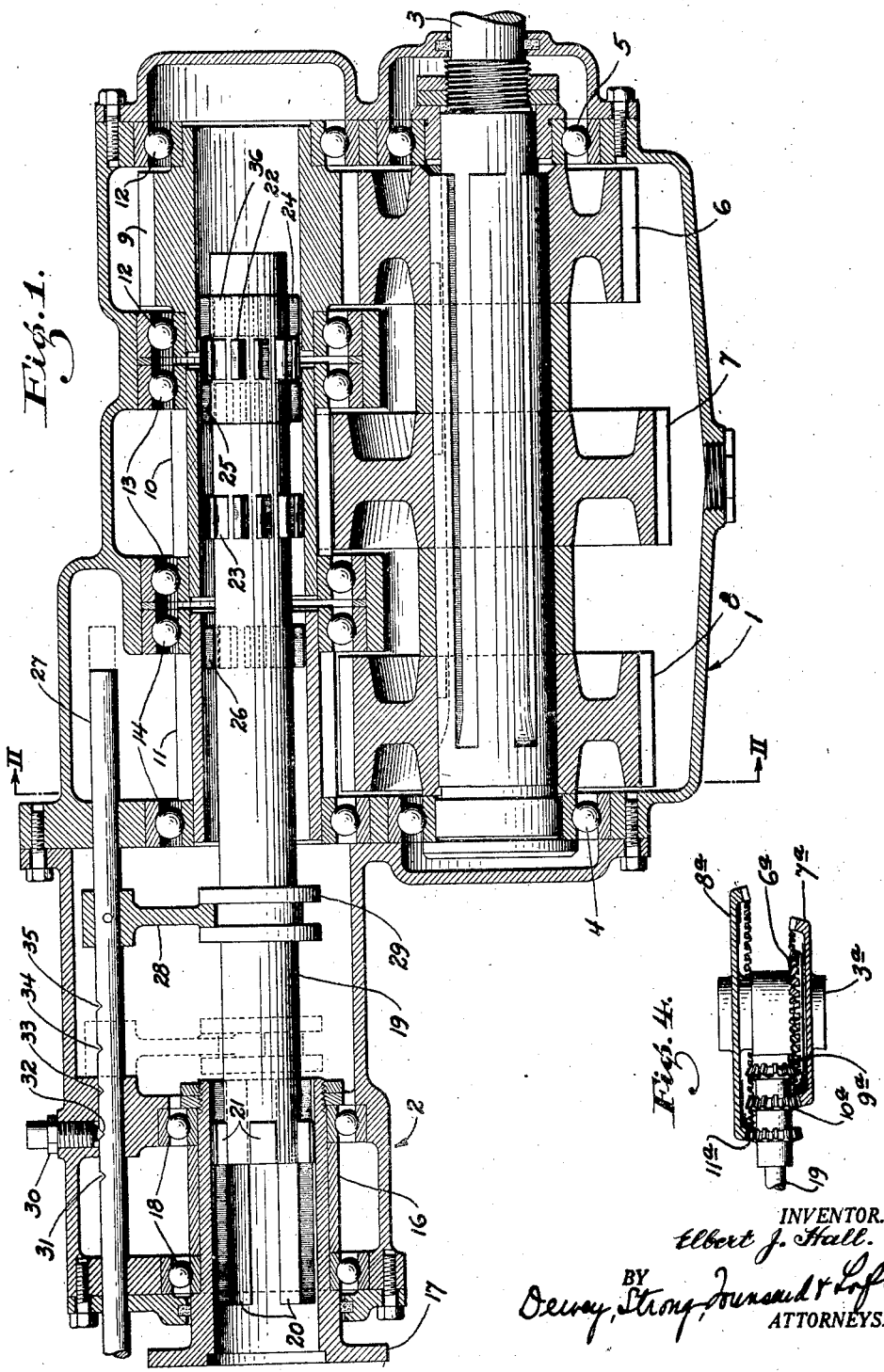

Patented Sept. 7, 1926.

1,598,861

UNITED STATES PATENT OFFICE.

ELBERT J. HALL, OF BERKELEY, CALIFORNIA.

TRANSMISSION GEARING.

Application filed November 27, 1925. Serial No. 71,585.

This invention relates to transmission gearing, and the primary object of the invention is to provide an improved transmission mechanism particularly adapted for use in various driving connections as will hereinafter appear.

As is well known, the standard automobile transmission comprises three speeds forward and one reverse, the highest forward speed being direct and the two lower speeds being indirect. This arrangement is ordinarily quite ideal, since most of the driving is done through the direct high speed connection. A somewhat different problem, however, is presented in such vehicles as heavy motor busses. These vehicles travel at a relatively high speed on the main highways but a great portion of their travel is in the city and heavy traffic where a reduced speed must be used. As now constructed, these vehicles must be driven at this reduced speed through the indirect transmission drive above mentioned. The indirect forward driving portion of the transmissions now in use is, like the reverse of the transmission, adapted to be used only in special instances and is not well adapted to continuous or regular driving purposes. It is furthermore objectionable to operate the vehicle under such two different driving conditions. It is the primary object of my invention to provide an improved transmission through which a vehicle or other mechanism can be driven at different speeds or ratios and exactly under the same conditions in each.

While my invention is particularly applicable to vehicles as above pointed out, it should be understood that the same may also be used with facility in other mechanisms. Another advantageous use of my invention may be mentioned, as marine engines. These engines ordinarily require one forward drive and one reverse drive, although two or more forward speeds may be provided if desired. My improved transmission as hereinabove described may be constructed to provide these driving connections, each driving under exactly the same conditions, and the same can furthermore be constructed to provide the forward and reverse drives with any relative speeds desired. The construction of such an improved transmission is another object of my invention.

In the accompanying drawings I have illustrated certain specific embodiments of my invention, but it will be understood that the invention can be otherwise embodied and that the drawings are not to be construed as defining or limiting the scope of the invention, the claims appended to this specification being relied upon for that purpose.

Referring to the figures of the drawings,

Fig. 1 is a longitudinal sectional view through a transmission consisting of one embodiment of my invention.

Fig. 2 is a cross sectional view therethrough taken on line II—II of Fig. 1.

Fig. 3 is a longitudinal sectional view through a modified construction of my invention.

Fig. 4 shows a plan view in section of a modified arrangement of the rear portion of the transmission mechanism.

Referring first to Figures 1 and 2 of the drawings, 1 indicates a transmission box or casing having an extension 2 secured to the forward end thereof. The driven shaft 3, which may be connected to the differential of a vehicle or other mechanism to be driven, is mounted on ball bearings 4 and 5. Gears 6, 7, and 8 are keyed to the shaft 3.

Cooperating gears 9, 10, and 11 are independently rotatably supported on ball bearings 12, 13, and 14 opposite the gears 6, 7, and 8. Gears 6 and 7 are respectively in mesh with gears 9 and 10, and gear 8 is drivingly connected to gear 11 through an idler gear 15. It will be noted that all these gears are of very sturdy construction and are provided with teeth having a very wide bearing surface, the teeth preferably being cut spirally to eliminate noise and chatter.

A driving sleeve 16 provided with a flange 17, which may be connected to the engine shaft, is mounted in ball bearings 18 in the casing 2 in axial alignment with the gears 9, 10, and 11. This sleeve may be operatively connected to any one of gears 9, 10, and 11 through an axially shiftable shaft 19. The bore of the sleeve is provided with a plurality of teeth 20 therein providing long grooves therebetween in which slide a pluraltiy of radial teeth 21 carried on the end of the shaft 19. The shaft can therefore be freely shifted axially and still remain in rotative driving engagement with the sleeve.

Two sets 22 and 23 of clutch teeth are provided on the other end of shaft 19 and the bores through the gears 9, 10, and 11 are large enough to freely receive these gear teeth sets therethrough. Cooperating sets of clutch teeth 24, 25, and 26 are provided within the bores of these gears. The shaft can be shifted axially by means of a rod 27 carrying a yoke 28 engaging between a pair of collars 29 on the shaft; a spring-pressed detent 30 is adapted to engage in notches 31 to 35 inclusive in the rod 27 to hold the shaft in its different shifted positions.

When the rod 27 is moved to engage the detent 30 in the notch 31, the teeth 22 are in mesh with the teeth 24 of the gear 9. With the detent in notch 32, the enlarged portion 36 of the shaft is supported by the teeth 24 and there is no driving engagement between shaft 19 and any of the gears. With the detent in notch 33, the teeth 22 are in mesh with the teeth 25 of the gear 10. With the detent in the notch 34, the portion 36 of the shaft is supported by the teeth 25 and there is no driving engagement between the shaft and any of the gears. With the detent in the notch 35, the teeth 23 are in mesh with the teeth 26 of the gear 11.

It should be particularly noted that the construction and arrangement are such that the shaft 19 is entirely out of contact with all the gears except the gear with which it is in driving engagement. When the shaft is in either of the two neutral positions, the same is supported on the enlarged circular bearing end 36.

It will now be seen that the transmission, as illustrated in Figs. 1 and 2, provides two forward speeds and a reverse, and that the driving conditions through all of such speeds is identical. Thus, a vehicle equipped with this improved transmission is operating identically under the same conditions whether in traffic, on a grade, or out on the open road. Furthermore, it will be noted that the gears 9, 10, and 11 not engaged by the shaft 19 are entirely free of such shaft and rotate freely and independently on their bearings. The gears as illustrated are constructed of wide and substantial proportions and in a manner giving a broad toothed driving surface.

In Fig. 3, I have illustrated a slightly modified construction of my invention. In this construction, 37 indicates the driven shaft having two gears 38 and 39 keyed thereon. These gears are in mesh with two gears 40 and 41 supported independently on ball bearings. A shaft 42, like the shaft 19, is adapted to be shifted axially by a yoke 43. The driving sleeve 44 and gears 40 and 41 are engaged with the shaft 42 in the same manner as above described in reference to Fig. 1. This construction is adapted to be used where it is desired to obtain two speeds only. For example, the same may be used as an auxiliary transmission in connection with the main drive shaft of a vehicle, thereby providing two speeds therefor. It will furthermore be understood that if desired one of the two driving connections shown in Fig. 3 can be constructed as a reverse merely by using an idler gear as shown in Fig. 2.

It is believed that the construction, operation, and advantages of my improved transmission will be clear from the above description and that further description herein is therefore unnecessary.

The present device is ideally suited for use with an oil feed planetary transmission mechanism, for the reason that the low peripheral speed of the teeth on shaft 19 will permit ease of shifting, notwithstanding the drag which occurs in wet transmissions of this sort. The shaft 19 may be employed as the propellor shaft or the power may be applied to shaft 3. The number of teeth or splines on the shaft 19 may be varied according to conditions, and various forms of gears 6, 7 and 8 may be used, such, for instance, as the herringbone type of gears.

In Fig. 4 the hollow gears through which the shiftable shaft 19 passes are indicated at $9^a$, $10^a$, and $11^a$, and are of the bevel type. They mesh with the ring gears $6^a$, $7^a$, and $8^a$, mounted on a shaft or axle $3^a$, which in automotive practice may be the rear axle. Thereby the same change-speed and reverse may be obtained as in Fig. 1.

Having thus described my invention, what I claim and desire to secure by Letters Patent is—

1. A transmission comprising a shaft, a pair of gears mounted thereon, a pair of gears each rotatably supported independently and respectively in mesh with the first mentioned gears, a shaft co-axial within the second mentioned gears, a set of internal clutch teeth on each of these gears, a set of cooperating clutch teeth on the co-axial shaft, the portion of this shaft adjacent opposite sides of this set being concentric of the shaft and of a diameter equal to the internal diameter of the clutch teeth on the gears whereby, when the set of teeth on the shaft is adjacent but not engaged with the gear clutch teeth, the shaft will be rotatably supported by the said gear teeth, and means for shifting this shaft axially to drivingly engage its set of clutch teeth with either set of gear clutch teeth, the clutch teeth end of the co-axial shaft being supported only by its co-axial gears.

2. A transmission comprising a shaft, a plurality of gears mounted thereon, a plurality of gears each rotatably supported independently and respectively in driving connection with the first mentioned gears, a shaft co-axial within the second mentioned gears, a set of internal clutch teeth on each of these gears, a plurality of sets of cooperating clutch teeth on the co-axial shaft, the portion of this shaft adjacent opposite sides of one last said set being concentric of the shaft and of a diameter equal to the internal diameter of the adjacent clutch teeth sets on the gears and so arranged that when the shaft and gear clutch teeth are in the neutral or disengaged position the shaft will be rotatably supported by the said concentric portion riding on the adjacent gear clutch teeth, and means for shifting this shaft axially to drivingly engage the same with any of the co-axial gears through the said clutch teeth, the clutch teeth end of the co-axial shaft being supported only by its co-axial gears.

3. A transmission comprising a shaft, a plurality of gears mounted thereon, a plurality of gears respectively in mesh with the first mentioned gears, antifriction bearings rotatably and independently supporting the second mentioned gears, a shaft co-axially within the second mentioned gears, inwardly extending clutch teeth within each of such gears, cooperating outwardly extending clutch teeth on the axially shiftable shaft, means for shifting this shaft axially to drivingly engage the same with any one of the gears through the said cooperating clutch teeth, and means whereby this shaft is supported concentrically within and by its gears when disengaged therefrom.

4. A transmission comprising a shaft, a plurality of gears mounted thereon, a plurality of gears each rotatably supported independently and respectively in driving connection with the first mentioned gears, a shaft co-axial within the second mentioned gears, cooperating teeth on this shaft and gears, means for shifting this shaft axially to drivingly engage the same with any one of the gears through the said teeth, means carried by the gears and shaft for supporting the shaft co-axially of and for free rotation within the gears when the same is disengaged from the gears, a sleeve coaxially over the axially shiftable shaft, and cooperating longitudinally extending teeth on the said shaft and sleeve whereby relative axial movement but not relative rotation is permitted therebetween.

ELBERT J. HALL.